(12) United States Patent  
Otani et al.

(10) Patent No.: US 8,666,324 B2  
(45) Date of Patent: Mar. 4, 2014

(54) SIGNAL GENERATING DEVICE AND SIGNAL GENERATING METHOD

(75) Inventors: Toru Otani, Atsugi (JP); Shinichi Ito, Atsugi (JP)

(73) Assignee: Anritsu Corporation, Atsugi-Shi (JP)

( * ) Notice: Subject to any disclaimer, the term of this patent is extended or adjusted under 35 U.S.C. 154(b) by 133 days.

(21) Appl. No.: 13/535,429

(22) Filed: Jun. 28, 2012

(65) Prior Publication Data

US 2013/0012139 A1 Jan. 10, 2013

(30) Foreign Application Priority Data

Jul. 6, 2011 (JP) ................................ 2011-150161

(51) Int. Cl.  
*H04B 17/00* (2006.01)

(52) U.S. Cl.  
USPC ..................................... 455/67.14; 455/115.1

(58) Field of Classification Search  
USPC ............. 455/423, 67.11, 67.14, 115.1, 115.2; 375/226; 332/100  
See application file for complete search history.

(56) References Cited

U.S. PATENT DOCUMENTS 5,835,850 A * 11/1998 Kumar ........................ 455/67.14  
5,945,885 A * 8/1999 Schwartz et al. ............. 332/100  
6,397,042 B1 * 5/2002 Prentice et al. ............. 455/67.14  
6,832,075 B1 * 12/2004 Henry, Jr. ................... 455/67.14  
7,130,589 B2 * 10/2006 Lee et al. .................... 455/67.11  
7,693,216 B1 * 4/2010 Katz ............................. 375/239  
8,126,452 B2 * 2/2012 Ries et al. ..................... 455/425  
8,509,294 B2 * 8/2013 Ito et al. ........................ 375/226

FOREIGN PATENT DOCUMENTS

JP H02-128432 U 10/1990

* cited by examiner

*Primary Examiner* — Sonny Trinh  
(74) *Attorney, Agent, or Firm* — Pearne & Gordon LLP

(57) ABSTRACT

To provide a signal generating device and a signal generating method capable of correcting the frequency characteristics of the level of a broadband radio-frequency signal. A signal generating device 10 includes a waveform data storage unit 11 that stores waveform data of a baseband signal, a quadrature modulator 20 that generates a modulation signal from the baseband signal, a local oscillator 31 that generates a local oscillation signal, a multiplier 32 that multiplies the modulation signal and the local oscillation signal to generate a radio-frequency signal in a predetermined frequency band, a frequency characteristic correction value determining unit 50 that acquires the frequency characteristics of the signal level of the frequency band on the basis of the center frequency of the radio-frequency signal, and a DF 12 that corrects the frequency characteristics of the level of the baseband signal.

10 Claims, 10 Drawing Sheets

(a)

| STEP ATT FREQUENCY CHARACTERISTIC TABLE | | 51 |
|---|---|---|
| STEP ATT VALUE | RF SIGNAL CENTER FREQUENCY ⋯ 1GHz ⋯ | |
| ⋮ | ⋮ | |
| 30dB | ⋯ 0.1 ⋯ | |
| ⋮ | ⋮ | |

(b)

| REFERENCE POINT FREQUENCY CHARACTERISTIC TABLE | | 45 |
|---|---|---|
| REFERENCE POINT LEVEL | RF SIGNAL CENTER FREQUENCY ⋯ 1GHz ⋯ | |
| ⋮ | ⋮ | |
| −10.3dBm | ⋯ $V_3$ ⋯ | |
| ⋮ | ⋮ | |

FIG. 13

SIGNAL GENERATING DEVICE AND SIGNAL GENERATING METHOD

TECHNICAL FIELD

The present invention relates to a signal generating device and a signal generating method which correct the frequency characteristics of a radio-frequency signal supplied in a characteristic test for mobile communication terminals, such as mobile phones or mobile terminals.

BACKGROUND ART

In the characteristic test for, for example, mobile communication terminals, a signal generating device has been used in order to supply a test signal to the mobile communication terminal. In general, the signal generating device includes an analog circuit. The analog circuit has frequency characteristics and the output level of the signal generating device varies depending on the frequency. Therefore, it is necessary to correct the frequency characteristics of the output level of the signal generating device.

For example, Patent Document 1 discloses a correction circuit as a circuit to carry out this type of correction. The correction circuit disclosed in Patent Document 1 includes an attenuator which attenuates an output signal from the signal generating device, a memory which stores, as a table, correction data for the frequency characteristics of the signal generating device which are measured in advance, and a CPU that reads the correction data from the memory and sets the amount of attenuation of the attenuator. The correction circuit corrects the frequency characteristics of the output level of the signal generating device.

RELATED ART DOCUMENT

Patent Document

[Patent Document 1] JP-UM-A-02-128432

DISCLOSURE OF THE INVENTION

Problem that the Invention is to Solve

By the way, in recent years, the frequency bandwidth used in the wireless communication of, for example, a mobile communication terminal has been widened. Therefore, the signal generating device needs to generate a broadband radio-frequency signal (for example, a bandwidth of 20 MHz).

However, the correction circuit disclosed in Patent Document 1 corrects the frequency characteristics of signals in a relative narrow band, but cannot correct the frequency characteristics of the level of the broadband radio-frequency signal.

The invention has been made in view of the above-mentioned problems and an object of the invention is to provide a signal generating device and a signal generating method capable of correcting the frequency characteristics of the level of a broadband radio-frequency signal.

Means for Solving Problem

According to a first aspect of the invention, a signal generating device includes: modulation signal generating means (20) for generating a modulation signal from a baseband signal; local oscillation signal generating means (31) for generating a local oscillation signal with a predetermined local oscillating frequency; radio-frequency signal generating means (32) for multiplying the modulation signal and the local oscillation signal to generate a radio-frequency signal in a predetermined frequency band; output level adjusting means (41) for adjusting the level of the radio-frequency signal; frequency characteristic acquiring means (52, 53b) for acquiring frequency characteristics of the level of the radio-frequency signal in the frequency band which is output from the output level adjusting means on the basis of a center frequency of the radio-frequency signal; and frequency characteristic correcting means (12, 55) for correcting the frequency characteristics of the level of the baseband signal on the basis of the frequency characteristics acquired by the frequency characteristic acquiring means.

According to this structure, the signal generating device according to the first aspect of the invention can correct the frequency characteristics of the level of the baseband signal on the basis of the frequency characteristics acquired by the frequency characteristic acquiring means, thereby correcting the frequency characteristics of the level of the broadband radio-frequency signal.

According to a second aspect of the invention, in the signal generating device, the modulation signal generating means may generate the modulation signal from a calibration signal, which is a baseband signal for generating a radio-frequency signal whose frequency is changed between an upper limit frequency and a lower limit frequency of the frequency band over time. The frequency characteristic acquiring means may acquire the output level of the output level adjusting means in correspondence with the change in the frequency.

According to a third aspect of the invention, in the signal generating device, the calibration signal may be a baseband signal for generating a radio-frequency signal which sweeps the frequency from the upper limit frequency to the lower limit frequency of the frequency band, or from the lower limit frequency to the upper limit frequency of the frequency band.

According to this structure, the signal generating device according to the second and third aspects of the invention can acquire the frequency characteristics of a predetermined frequency band.

According to a fourth aspect of the invention, the signal generating device may include the frequency characteristic acquiring means according to the first aspect as first frequency characteristic acquiring means. The signal generating device may further include: second frequency characteristic acquiring means (45, 46) for acquiring the frequency characteristics of the output level of the output level adjusting means; and control voltage generating means (47) for generating a control voltage for controlling the amount of adjustment of the output level adjusting means on the basis of the frequency characteristics acquired by the second frequency characteristic acquiring means and correcting the frequency characteristics of the output level of the output level adjusting means.

According to this structure, the signal generating device according to the fourth aspect of the invention can correct the frequency characteristics of the output level of the output level adjusting means, thereby correcting the frequency characteristics of the level of the broadband radio-frequency signal considering the frequency characteristics of the output level adjusting means.

According to a fifth aspect of the invention, the signal generating device may include the output level adjusting means according to the first aspect as first output level adjusting means. The signal generating device may further include: second output level adjusting means (16) for adjusting the output level of an output signal from the first output level adjusting means; and third frequency characteristic acquiring means (51, 53a) for acquiring the frequency characteristics of the output level of the second output level adjusting means. The first frequency characteristic correcting means may correct the frequency characteristics of the level of the baseband signal considering the frequency characteristics acquired by the third frequency characteristic acquiring means.

According to this structure, the signal generating device according to the fifth aspect of the invention can correct the frequency characteristics of the output level of the second output level adjusting means, thereby correcting the frequency characteristics of the level of the broadband radio-frequency signal considering the frequency characteristics of the second output level adjusting means.

According to a sixth aspect of the invention, a signal generating method includes: a modulation signal generating step (S34) of generating a modulation signal from a baseband signal; a local oscillation signal generating step (S35) of generating a local oscillation signal with a predetermined local oscillating frequency; a radio-frequency signal generating step (S36) of multiplying the modulation signal and the local oscillation signal to generate a radio-frequency signal in a predetermined frequency band; a frequency characteristic acquiring step (S38) of acquiring frequency characteristics of the level of the radio-frequency signal in the frequency band generated in the radio-frequency signal generating step on the basis of a center frequency of the radio-frequency signal; and a frequency characteristic correcting step (S42) of correcting the frequency characteristics of the level of the baseband signal on the basis of the frequency characteristics acquired in the frequency characteristic acquiring step.

According to this structure, the signal generating method according to the sixth aspect of the invention can correct the frequency characteristics of the level of the baseband signal on the basis of the frequency characteristics acquired in the frequency characteristic acquiring step, thereby correcting the frequency characteristics of the level of the broadband radio-frequency signal.

According to a seventh aspect of the invention, in the signal generating method, the modulation signal generating step may generate the modulation signal from a calibration signal, which is a baseband signal for generating a radio-frequency signal whose frequency is changed between an upper limit frequency and a lower limit frequency of the frequency band over time. The frequency characteristic acquiring step may acquire the output level of the radio-frequency signal in correspondence with the change in the frequency.

According to an eighth aspect of the invention, in the signal generating method, the calibration signal may be a baseband signal for generating a radio-frequency signal which sweeps the frequency from the upper limit frequency to the lower limit frequency of the frequency band, or from the lower limit frequency to the upper limit frequency of the frequency band.

According to this structure, the signal generating method according to the seventh and eighth aspects of the invention can acquire the frequency characteristics of a predetermined frequency band.

According to a ninth aspect of the invention, the signal generating method may include the frequency characteristic acquiring step according to the sixth aspect as a first frequency characteristic acquiring step and the frequency characteristic correcting step according to the sixth aspect as a first frequency characteristic correcting step. The signal generating method may further include: an output level adjusting step of adjusting the output level of the radio-frequency signal generated in the radio-frequency signal generating step; a second frequency characteristic acquiring step of acquiring frequency characteristics of the output level; and a second frequency characteristic correcting step of correcting the frequency characteristics of the output level on the basis of the frequency characteristics acquired in the second frequency characteristic acquiring step.

According to this structure, the signal generating method according to the ninth aspect of the invention can correct the frequency characteristics of the output level of the radio frequency signal, thereby correcting the frequency characteristics of the level of the broadband radio-frequency signal considering the frequency characteristics in the output level adjusting step.

According to a tenth aspect of the invention, the signal generating method may include the output level adjusting step according to the ninth aspect as a first output level adjusting step. The signal generating method may further include: a second output level adjusting step of adjusting the output level of the output signal in the first output level adjusting step; and a third frequency characteristic acquiring step of acquiring the frequency characteristics of the output level in the second output level adjusting step. The first frequency characteristic correcting step may correct the frequency characteristics of the level of the baseband signal considering the frequency characteristics acquired in the third frequency characteristic acquiring step.

According to this structure, the signal generating method according to the tenth aspect of the invention can correct the frequency characteristics of the output level in the second output level adjusting step, thereby correcting the frequency characteristics of the level of the broadband radio-frequency signal considering the frequency characteristics in the second output level adjusting step.

Advantage of the Invention

The invention can provide a signal generating device and a signal generating method capable of correcting the frequency characteristics of the level of a broadband radio-frequency signal.

BRIEF DESCRIPTION OF THE DRAWINGS

FIG. 13 is a diagram illustrating an example of the step ATT frequency characteristic table and the reference point frequency characteristic table of the signal generating device according to the embodiment of the invention.

BEST MODE FOR CARRYING OUT THE INVENTION

Hereinafter, embodiments of the invention will be described with reference to the accompanying drawings.

First, the structure of a signal generating device according to an embodiment of the invention will be described.

Figure 1:
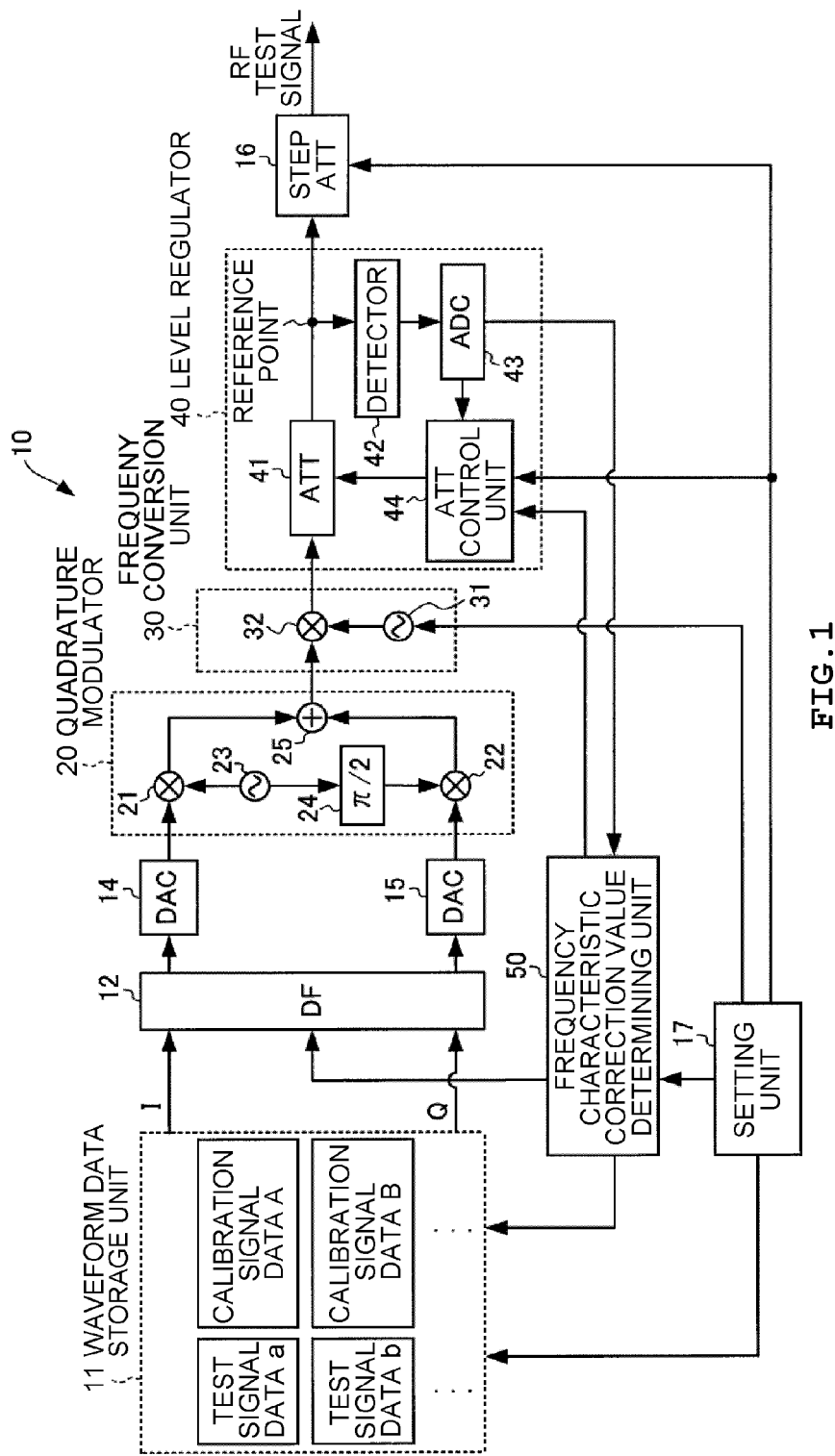
FIG. 1 is a block diagram illustrating a signal generating device according to an embodiment of the invention.

As shown in FIG. 1, a signal generating device 10 according to this embodiment includes a waveform data storage unit 11, a digital filter (DF) 12, digital-to-analog converters (DACs) 14 and 15, a step attenuator (ATT) 16, a setting unit 17, a quadrature modulator 20, a frequency conversion unit 30, a level regulator 40, and a frequency characteristic correction value determining unit 50.

The waveform data storage unit 11 stores digital baseband waveform data. Specifically, the waveform data storage unit 11 stores a plurality of test signal data items (a, b, . . . ) for testing a device to be tested and a plurality of calibration signal data items (A, B, . . . ) for calibrating frequency characteristics. The test signal data includes baseband waveform data of an I-phase component (in-phase component) and a Q-phase component (orthogonal component) set by the user. The calibration signal data includes baseband CW (Continuous Wave) waveform data of an I-phase component and a Q-phase component with a predetermined frequency. The waveform data is generated by, for example, a DSP (Digital Signal Processor) (not shown).

Figure 2:
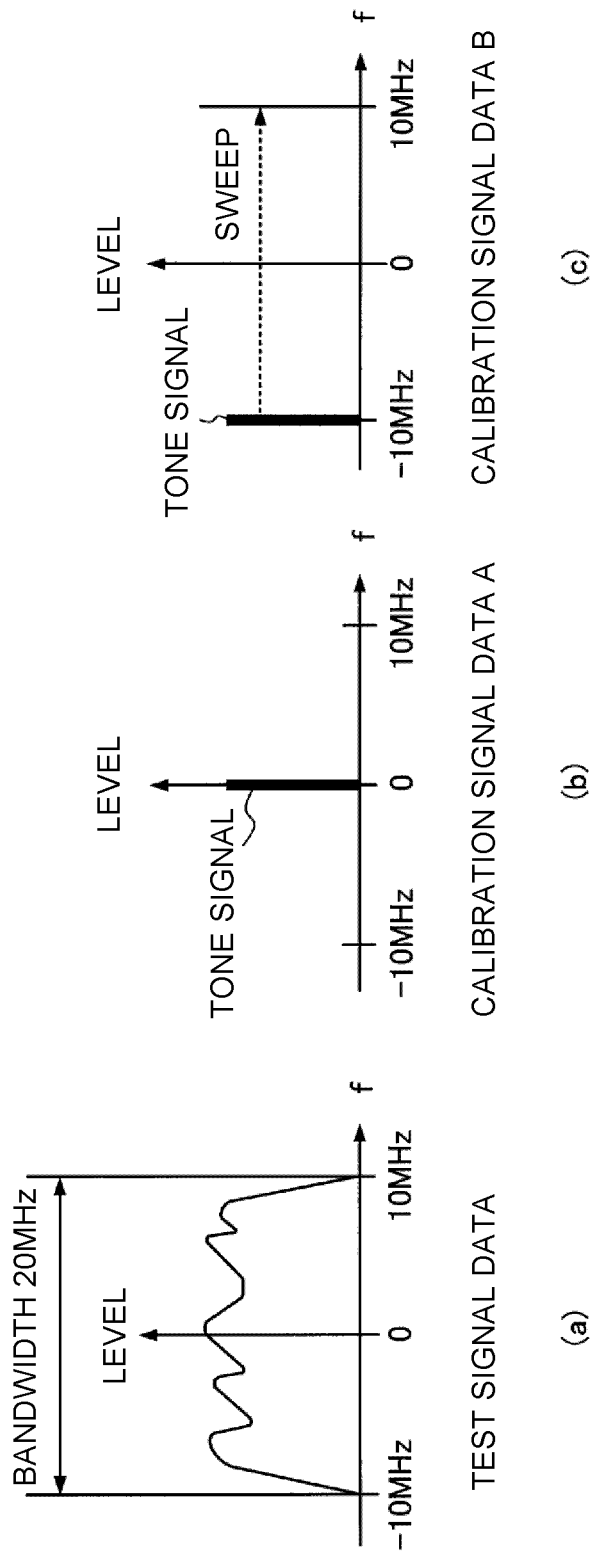
FIG. 2 is a diagram illustrating an example of test signal data and calibration signal data in the signal generating device according to the embodiment of the invention.

FIG. 2 shows an example of the test signal data and the calibration signal data stored in the waveform data storage unit 11. For example, as shown in FIG. 2(a), the test signal data is waveform data in which a time region signal is represented as a frequency region signal. In the case of a signal with a bandwidth of 20 MHz, the test signal data is represented as waveform data of a complex baseband signal with a center frequency of 0 MHz and a bandwidth of ±10 MHz. The calibration signal data is, for example, data shown in FIGS. 2(b) and 2(c). That is, as shown in FIG. 2(b), calibration signal data A is a tone signal with a center frequency of 0 MHz. As shown in FIG. 2(c), calibration signal data B is a tone signal capable of sweeping a frequency of −10 MHz to +10 MHz. In addition, instead of the calibration signal data B shown in FIG. 2(c), a plurality of tone signals may be provided at a predetermined frequency pitch in the range from −10 MHz to +10 MHz.

The DF 12 has a filter coefficient which is set by the frequency characteristic correction value determining unit 50, which will be described below, and corrects the signal levels of the I-phase and Q-phase baseband signal waveform data items output from the waveform data storage unit 11. The DF 12 forms frequency characteristic correcting means according to the invention. In FIG. 1, the DF 12 is shown as one digital filter. However, two digital filters corresponding to the I-phase and Q-phase baseband signal waveform data items may be provided.

Each of the DACs 14 and 15 converts the digital baseband signal waveform data output from the DF 12 into analog baseband signal waveform data and outputs the converted analog baseband signal waveform data to the quadrature modulator 20.

The quadrature modulator 20 includes multipliers 21 and 22, a local oscillator 23, a 90-degree phase shifter 24, and an adder 25. The quadrature modulator 20 forms modulation signal generating means according to the invention.

The multiplier 21 multiplies an I-phase component from the DAC 14 and a local oscillation signal from the local oscillator 23. The multiplier 22 multiplies a Q-phase component from the DAC 15 and a local oscillation signal which is shifted 90 degrees by the 90-degree phase shifter 24. The adder 25 adds the output signals from the multipliers 21 and 22 and outputs a quadrature modulation signal obtained by the addition to the frequency conversion unit 30.

The frequency conversion unit 30 includes a local oscillator 31 and a multiplier 32. The local oscillator 31 generates a local oscillation signal with a predetermined local oscillating frequency and supplies the local oscillation signal to the multiplier 32. The multiplier 32 multiplies the output signal from the quadrature modulator 20 and the local oscillation signal and outputs a radio-frequency (hereinafter, referred to as "RF") signal obtained by the multiplication to the level regulator 40. The local oscillator 31 forms local oscillation signal generating means according to the invention. The multiplier 32 forms radio-frequency signal generating means according to the invention. When the oscillating frequency of the local oscillator 23 of the quadrature modulator 20 is RF, the frequency conversion unit 30 may be omitted and the quadrature modulator 20 may perform frequency conversion. In this case, the quadrature modulator 20 serves as modulation signal generating means, local oscillation signal generating means, and radio-frequency signal generating means according to the invention.

The level regulator 40 includes an ATT 41, a detector 42, an analog-to-digital converter (ADC) 43, and an ATT control unit 44.

The ATT 41 receives a control voltage for setting the amount of attenuation from the ATT control unit 44 and sets the amount of attenuation for the power level of the output signal from the frequency conversion unit 30 according to the control voltage. The ATT 41 can set a very small amount of attenuation in the unit of, for example, 0.1 dB. A reference point for adjusting the level of the level regulator 40 is provided on the output side of the ATT 41. The signal which is attenuated to a predetermined power level at the reference point is output to the detector 42 and the step ATT 16. The ATT 41 forms output level adjusting means and first output level adjusting means according to the invention.

The detector 42 detects the output signal from the ATT 41 and outputs the detected signal to the ADC 43.

The ADC 43 converts an analog signal detected by the detector 42 into a digital signal and outputs the digital signal to the ATT control unit 44.

The ATT control unit 44 generates a control voltage where the power value of the reference point is a desired power value (for example, −10 dBm) and outputs the control voltage to the ATT 41. The detailed structure of the ATT control unit 44 will be described below.

The frequency characteristic correction value determining unit 50 determines a correction value for flattening the frequency characteristics of the signal level of the test signal data output from the waveform data storage unit 11 and sets the filter coefficient of the DF 12 on the basis of the correction value. The detailed structure of the frequency characteristic correction value determining unit 50 will be described below.

In the step ATT 16, the amount of attenuation is set at a step (for example, a step of 5 dB) more than that in the ATT 41. That is, a relatively large amount of attenuation is set to the step ATT 16 and a very small amount of attenuation is set to the ATT 41. The amount of attenuation of the step ATT 16 is set by a setting signal from the setting unit 17. The step ATT 16 forms second output level adjusting means according to the invention.

The setting unit 17 sets data for various test conditions which are input by the operation of an operation unit (not shown), such as a keyboard or a dial, by the user to each unit.

Next, the detailed structure of the ATT control unit 44 and the frequency characteristic correction value determining unit 50 will be described with reference to FIGS. 3 to 5.

Figure 3:
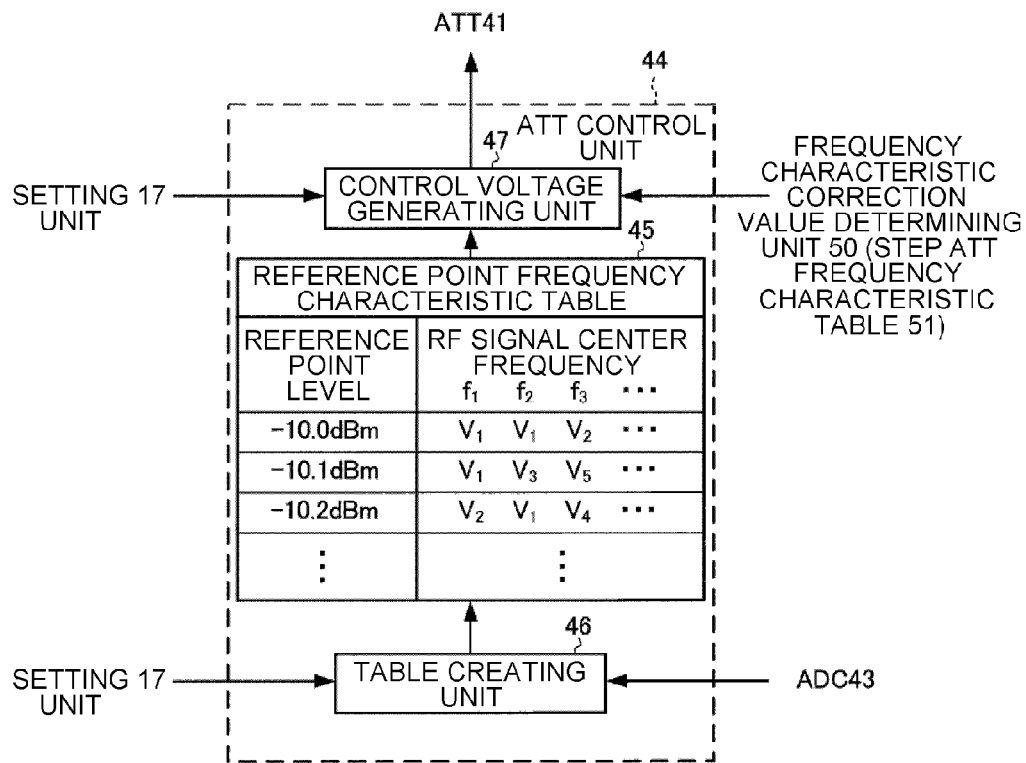
FIG. 3 is a block diagram illustrating an ATT control unit of the signal generating device according to the embodiment of the invention.

The ATT control unit 44 has the structure shown in FIG. 3. That is, the ATT control unit 44 includes a reference point frequency characteristic table 45, a table creating unit 46, and a control voltage generating unit 47. The reference point frequency characteristic table 45 and the table creating unit 46 form second frequency characteristic acquiring means according to the invention.

The reference point frequency characteristic table 45 indicates the frequency characteristics of a power value (hereinafter, simply referred to as a "reference point level") at the reference point (see FIG. 1) of the level regulator 40.

Specifically, the calibration signal data A shown in FIG. 2(*b*) is output from the waveform data storage unit 11, and the set value (control voltage value) of the ATT 41 is calculated in advance when the reference point level is, for example, −10.0 dBm, . . . −11.0 dBm, . . . −12.0 dBm, . . . while an RF signal center frequency output from the frequency conversion unit 30 is changed to $f_1, f_2, f_3, \ldots$. In FIG. 3, for example, the set value of the ATT 41 where the reference point level of a signal with the RF signal center frequency $f_3$ is −10.2 dBm is $V_4$.

Figure 4:
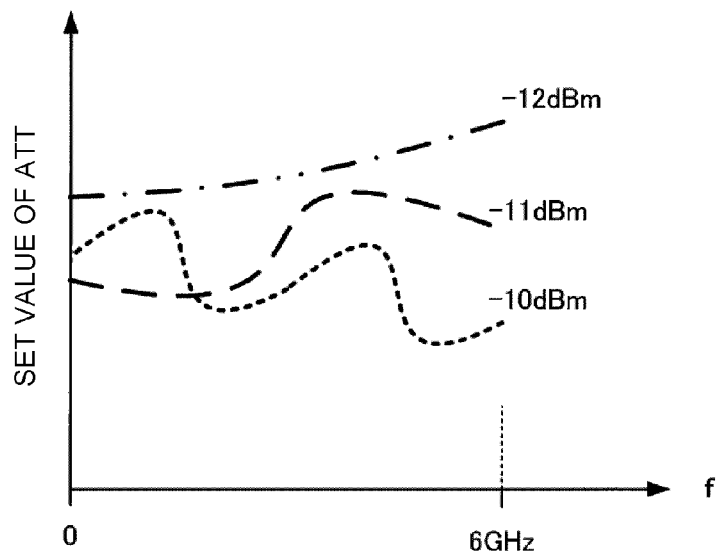
FIG. 4 is a graph illustrating a reference point frequency characteristic table of the signal generating device according to the embodiment of the invention.

FIG. 4 shows a graph illustrating the reference point frequency characteristic table 45. FIG. 4 shows an example of the set value of the ATT 41 where the reference point level is −10 dBm, −11 dBm, and −12 dBm at an RF signal center frequency of 0 GHz to 6 GHz.

The table creating unit 46 is used to create or update the reference point frequency characteristic table 45, receives information about the RF signal center frequency from the setting unit 17, and receives information about the reference point level from the ADC 43.

The control voltage generating unit 47 receives the information about the RF signal center frequency and information about the amount of attenuation set to the ATT 41 from the setting unit 17. In addition, the control voltage generating unit 47 receives the table value of a step ATT frequency characteristic table 51, which will be described below, from the frequency characteristic correction value determining unit 50. Then, the control voltage generating unit 47 generates a control voltage for setting the amount of attenuation of the ATT 41 with reference to the reference point frequency characteristic table 45 and the step ATT frequency characteristic table 51, considering the frequency characteristics of the step ATT 16, and outputs the control voltage to the ATT 41. The control voltage generating unit 47 forms control voltage generating means according to the invention.

Figure 5:
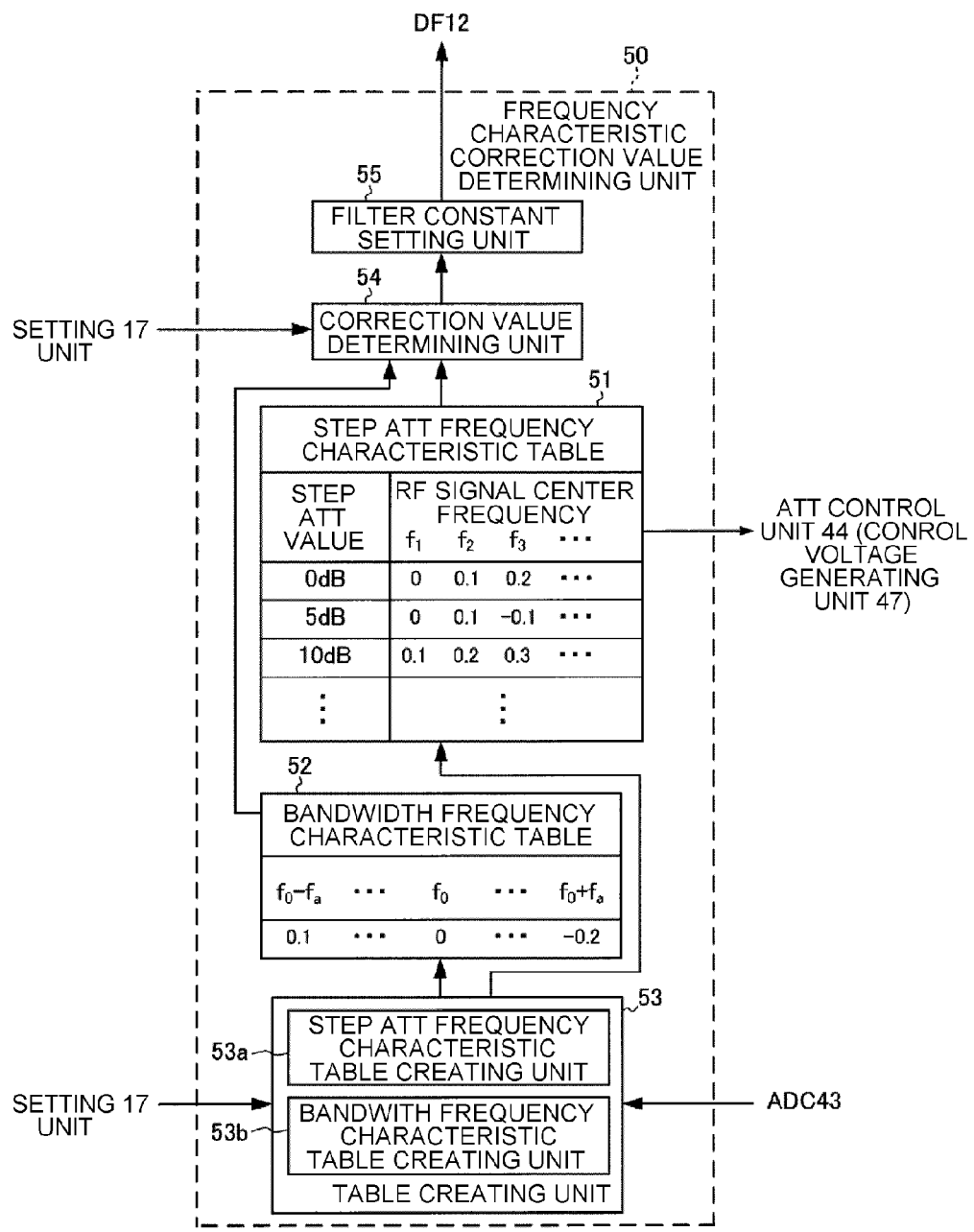
FIG. 5 is a block diagram illustrating a frequency characteristic correction value determining unit of the signal generating device according to the embodiment of the invention.

The frequency characteristic correction value determining unit 50 has the structure shown in FIG. 5. That is, the frequency characteristic correction value determining unit 50 includes the step ATT frequency characteristic table 51, a bandwidth frequency characteristic table 52, a table creating unit 53, a correction value determining unit 54, and a filter coefficient setting unit 55.

The step ATT frequency characteristic table 51 indicates the frequency characteristics of the step ATT 16. The table value of the step ATT frequency characteristic table 51 is referred to by the control voltage generating unit 47 of the ATT control unit 44. The step ATT frequency characteristic table 51 forms third frequency characteristic acquiring means according to the invention.

Specifically, the calibration signal data A shown in FIG. 2(*b*) is output from the waveform data storage unit 11, with a level measuring device connected to the output side of the step ATT 16, and the difference between an ideal value and the measured value is calculated in advance when the amount of attenuation (step ATT value) of the step ATT 16 is set to 0 dB, 5 dB, 10 dB, . . . while the RF signal center frequency is changed to $f_1, f_2, f_3, \ldots$. The reference point level is calibrated for each RF signal center frequency, that is, the frequency characteristics are flat.

Figure 6:
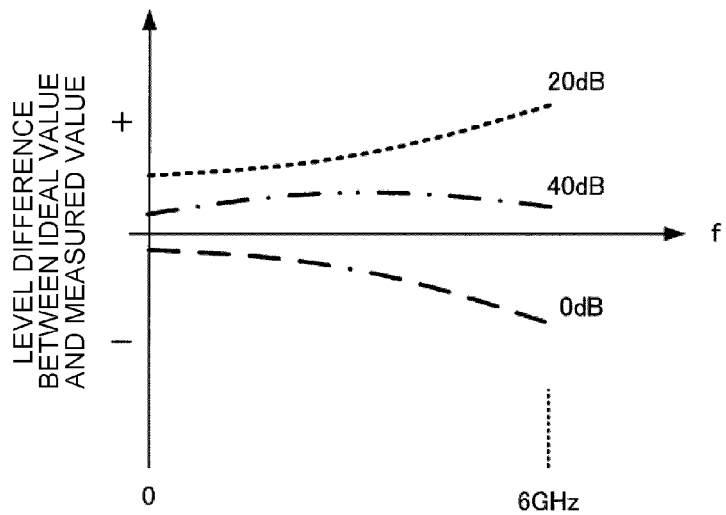
FIG. 6 is a graph illustrating a step ATT frequency characteristic table of the signal generating device according to the embodiment of the invention.

FIG. 6 is a graph illustrating the step ATT frequency characteristic table 51. FIG. 6 shows an example of the difference (dB) between the ideal value and the measured value of the signal level when the step ATT value is 0 dB, 20 dB, and 40 dB at an RF signal center frequency of 0 GHz to 6 GHz.

The bandwidth frequency characteristic table 52 indicates the frequency characteristics of the signal level in an RF frequency band which is output from the level regulator 40 in a non-calibrated state. In other words, the bandwidth frequency characteristic table 52 indicates the frequency characteristics of analog circuits from the output of the DACs 14 and 15 to the output of the level regulator 40. The bandwidth frequency characteristic table 52 forms frequency characteristic acquiring means and first frequency characteristic acquiring means according to the invention.

Specifically, the calibration signal data B shown in FIG. 2(*c*) is output from the waveform data storage unit 11, and the difference between the ideal value and the measured value of the output level of the ADC 43 when the RF signal frequency is changed from the lower limit $f_0 - f_a$ to the upper limit $f_0 + f_a$ of the frequency band including the RF signal center frequency $f_0$ is calculated in advance. The above-mentioned reference point level is calibrated for each RF signal center frequency. The bandwidth frequency characteristic table 52 indicates the signal levels at other frequencies using, for example, a signal level of 0 dB at the RF signal center frequency $f_0$ as a reference value.

Figure 7:
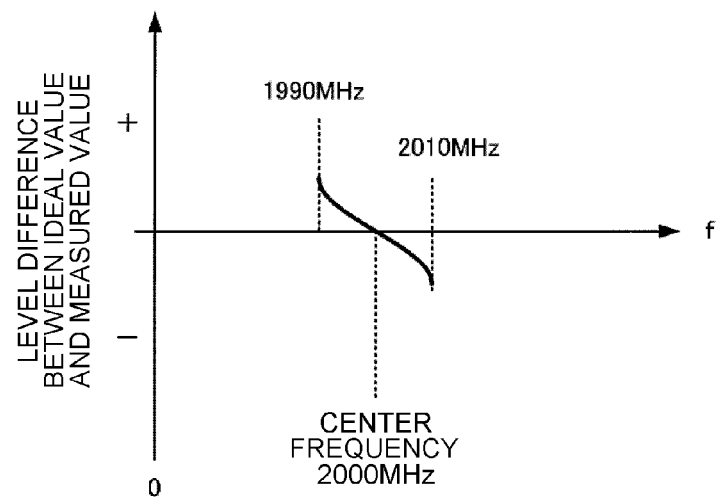
FIG. 7 is a graph illustrating a bandwidth frequency characteristic table of the signal generating device according to the embodiment of the invention.

FIG. 7 is a graph illustrating the bandwidth frequency characteristic table 52. FIG. 7 shows an example of the difference between the ideal value and the measured value when the RF signal center frequency is 2000 MHz, the lower limit of the RF signal frequency is 1990 MHz, and the upper limit of the RF signal frequency is 2010 MHz (bandwidth: 20 MHz).

The table creating unit 53 includes a step ATT frequency characteristic table creating unit 53*a* that is used to create or update the step ATT frequency characteristic table 51 and a bandwidth frequency characteristic table creating unit 53*b* that is used to create or update the bandwidth frequency characteristic table 52. The table creating unit 53 receives information about the RF signal center frequency and the bandwidth from the setting unit 17 and receives information about the reference point level from the ADC 43. The step ATT frequency characteristic table creating unit 53a forms third frequency characteristic acquiring means according to the invention. The bandwidth frequency characteristic table creating unit 53b forms frequency characteristic acquiring means and first frequency characteristic acquiring means according to the invention.

The correction value determining unit 54 determines a correction value for correcting the frequency characteristics of the test signal data to be flat with reference to the step ATT frequency characteristic table 51 and the bandwidth frequency characteristic table 52. The correction value determining unit 54 receives the information about the RF signal center frequency and the bandwidth from the setting unit 17.

Figure 8:
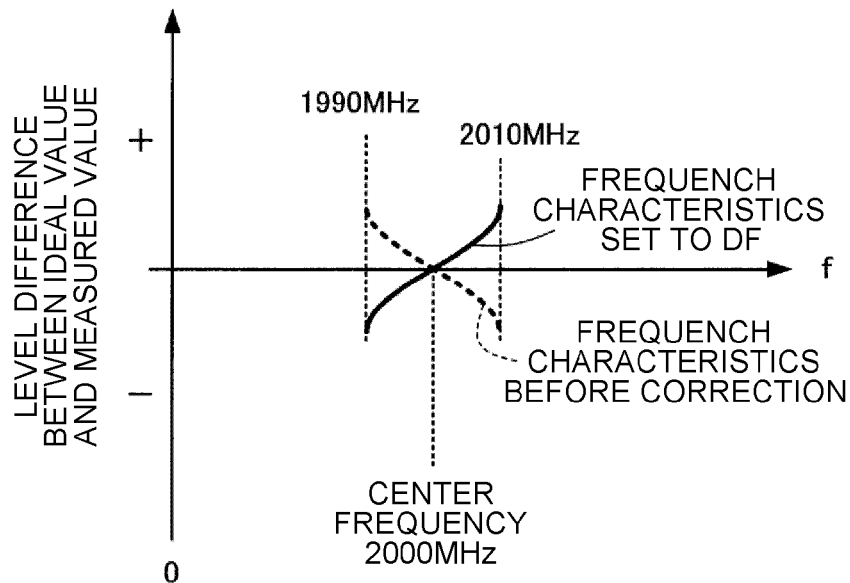
FIG. 8 is a diagram illustrating frequency characteristics set to a DF of the signal generating device according to the embodiment of the invention.

The filter coefficient setting unit 55 outputs a signal for setting the filter coefficient of the DF 12 on the basis of the correction value determined by the correction value determining unit 54 to the DF 12. The filter coefficient setting unit 55 forms frequency characteristic correcting means according to the invention. The filter coefficient setting unit 55 calculates filter coefficients other than the calculated frequency using an interpolation process of the generation of an approximate expression. As a result, as shown in FIG. 8, the signal output from the DF 12 is changed from the frequency characteristics before correction represented by a dashed line to the frequency characteristics after correction represented by a solid line. Therefore, the signal generating device 10 can output an RF test signal with flat frequency characteristics.

Next, a process of calculating the reference point frequency characteristic table 45 and the step ATT frequency characteristic table 51 will be described. The tables are acquired prior to shipment from the factory.

Figure 9:
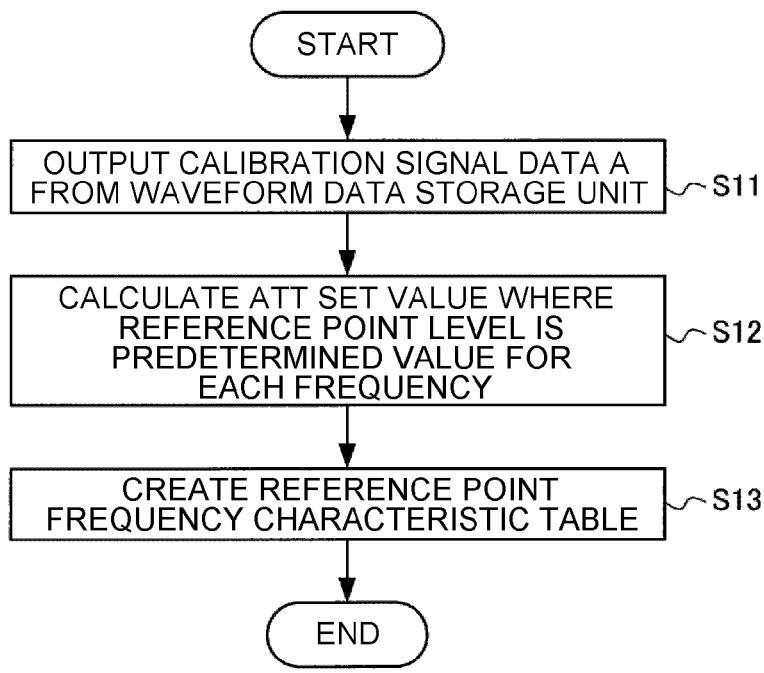
FIG. 9 is a flowchart illustrating a process of calculating the reference point frequency characteristic table of the signal generating device according to the embodiment of the invention.

First, a process of calculating the reference point frequency characteristic table 45 is shown in FIG. 9. As shown in FIG. 9, the calibration signal data A (see FIG. 2(b)) is output from the waveform data storage unit 11 by the setting unit 17 (Step S11).

Then, the setting unit 17 calculates the set value of the ATT 41 for making the reference point level equal to a predetermined value for each frequency (Step S12). For example, as shown in FIG. 4, the setting unit 17 calculates the set value of the ATT 41 where the reference point level is −10 dBm, −11 dBm, −12 dBm, ... at an RF signal center frequency of 0 GHz to 6 GHz.

Then, the table creating unit 46 creates the reference point frequency characteristic table 45 (Step S13) and the ATT control unit 44 stores data for the reference point frequency characteristic table 45.

Figure 10:
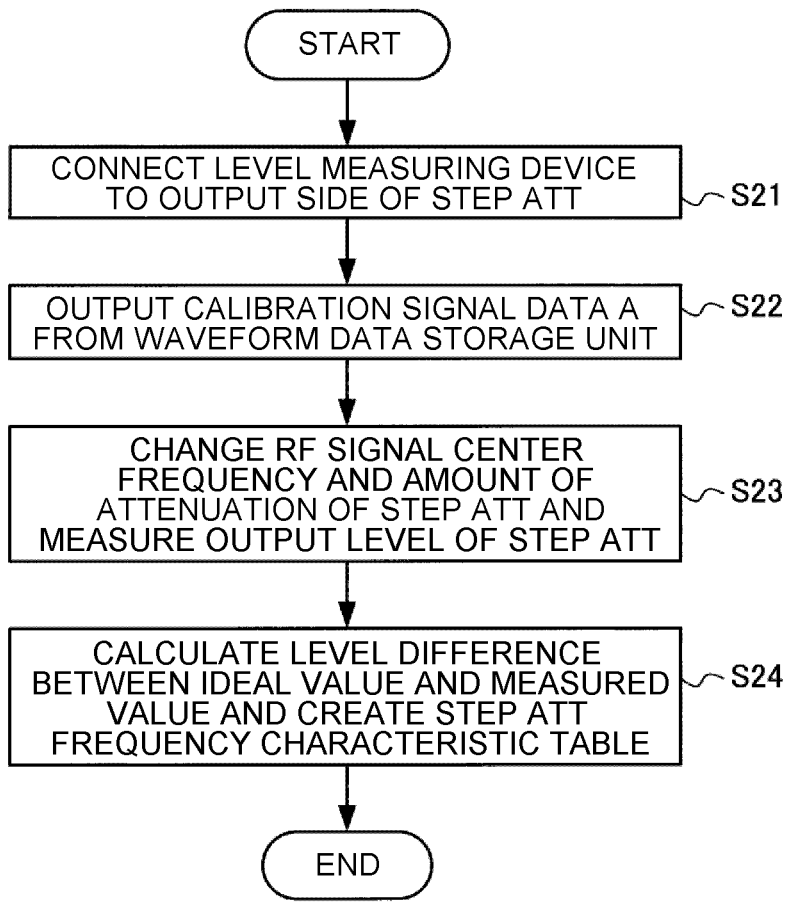
FIG. 10 is a flowchart illustrating a process of calculating the step ATT frequency characteristic table of the signal generating device according to the embodiment of the invention.

A process of calculating the step ATT frequency characteristic table 51 is shown in FIG. 10. As shown in FIG. 10, a level measuring device is connected to the output side of the step ATT 16 (Step S21).

The calibration signal data A (see FIG. 2(b)) is output from the waveform data storage unit 11 by the setting unit 17 (Step S22).

The setting unit 17 changes the RF signal center frequency and the amount of attenuation of the step ATT 16 and measures the output level of the step ATT 16 (Step S23).

The step ATT frequency characteristic table creating unit 53a calculates the level difference between the ideal value and the measured value and creates the step ATT frequency characteristic table 51 (Step S24). Data for the step ATT frequency characteristic table 51 is stored in the frequency characteristic correction value determining unit 50.

Figure 11:
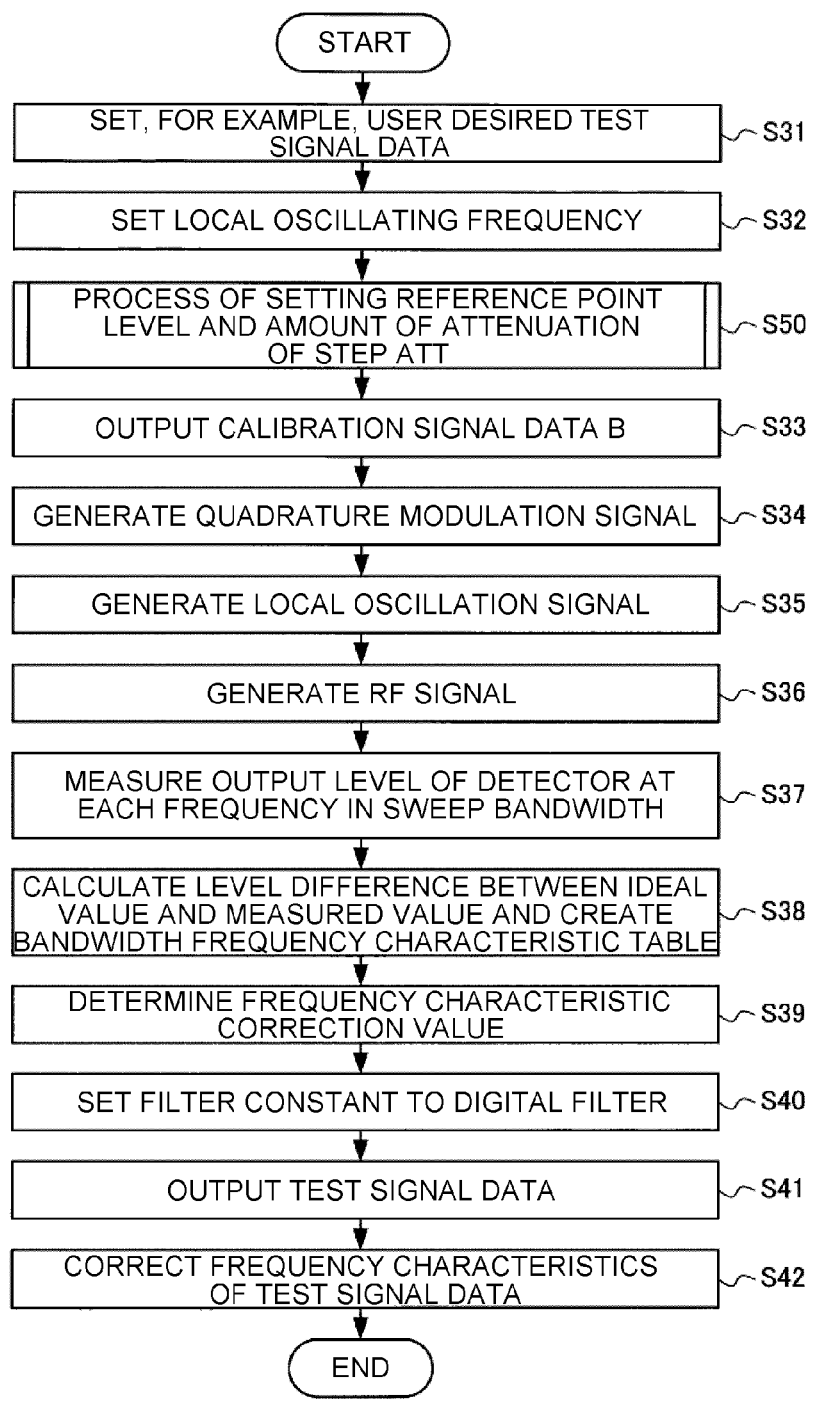
FIG. 11 is a flowchart illustrating the operation of the signal generating device according to the embodiment of the invention.

Next, the operation of the signal generating device 10 according to this embodiment will be described with reference to FIG. 11.

The setting unit 17 sets, for example, user desired test signal data, which is a user set value set by the operation of the operation unit by the user, the RF signal center frequency, and the output level of the signal generating device 10 to a predetermined unit (Step S31).

The setting unit 17 uses the local oscillating frequency of the frequency conversion unit 30 as the user set value (Step S32).

Figure 12:
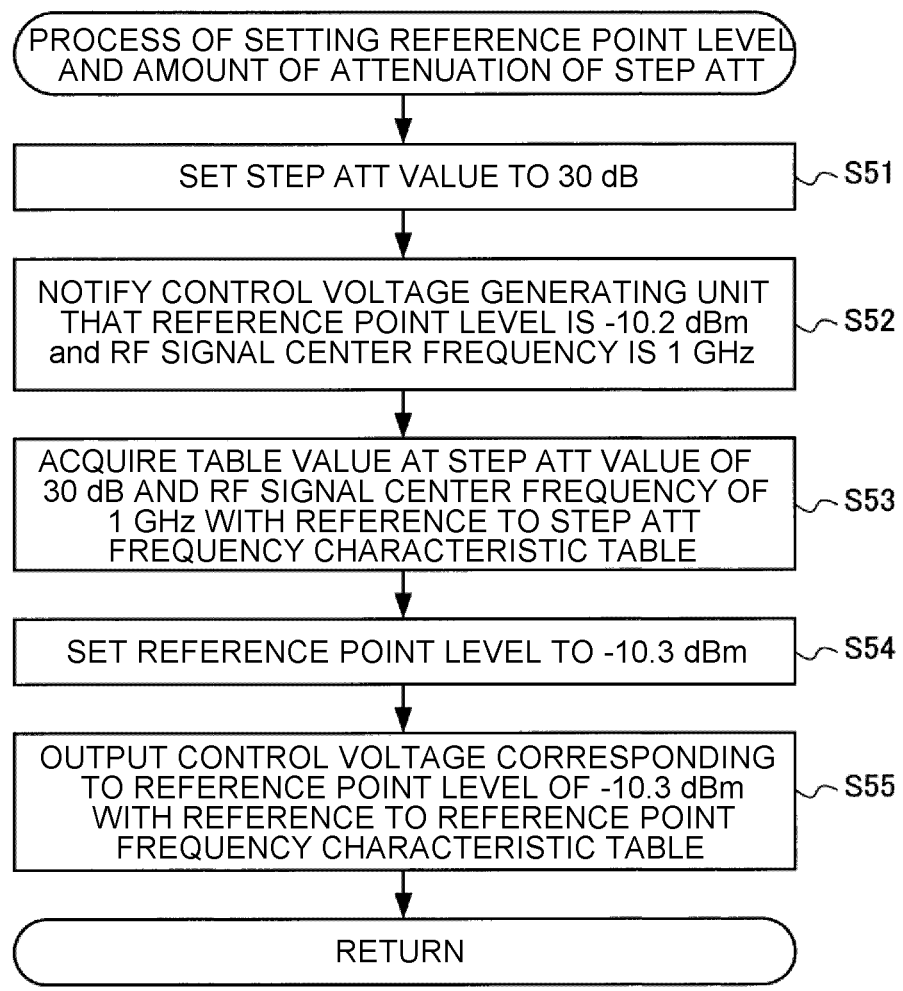
FIG. 12 is a flowchart illustrating a process of setting a reference point level and the amount of attenuation of a step ATT in the signal generating device according to the embodiment of the invention.

The setting unit 17 sets the reference point level and the amount of attenuation of the step ATT such that the reference point level of the level regulator 40 corresponds to the user set level (Step S50). Step S50 will be described with reference to FIGS. 12 and 13. In the following description, in Step S31, it is assumed that the user sets the RF signal center frequency to 1 GHz and sets the output level of the signal generating device 10 to −40.2 dBm.

The setting unit 17 sets the amount of attenuation of the step ATT 16 to 30 dB (Step S51).

The setting unit 17 instructs the control voltage generating unit 47 to set the reference point level to −10.2 dBm and notifies the control voltage generating unit 47 that the RF center frequency is 1 GHz (Step S52).

The control voltage generating unit 47 acquires a table value of 0.1 dB at a step ATT value of 30 dB and an RF center frequency of 1 GHz with reference to the step ATT frequency characteristic table 51 (FIG. 13(a)) (Step S53).

The control voltage generating unit 47 determines the actual reference point level to be −10.3 dBm on the basis of the set value (=−10.2 dBm) of the reference point level notified by the setting unit 17 in Step S52 and the table value (=0.1 dB) of the step ATT 16 acquired in Step S53 (Step S54).

The control voltage generating unit 47 acquires a control voltage value of $V_3$ of the ATT 41 where the reference point level of the signal with an RF signal center frequency of 1 GHz is −10.3 dBm with reference to the reference point frequency characteristic table 45 (FIG. 13(b)), generates a control voltage with a control voltage value of $V_3$, and outputs the control voltage to the ATT 41 (Step S55).

By the above-mentioned operation, the signal which is controlled to −10.3 dBm at the reference point level is input to the step ATT 16 and is attenuated by 29.9 dB, and a signal with an output level of −40.2 dBm is output from the signal generating device 10. Next, returning to FIG. 11, the process will be continuously described.

The calibration signal data B (see FIG. 2(c)) is output from the waveform data storage unit 11 to the DF 12 by the setting unit 17 (Step S33). In this case, no filter is applied to the DF 12 (filter through state). The calibration signal data B is converted from an analog signal to a digital signal by the DACs 14 and 15 and the quadrature modulator 20 generates a quadrature modulation signal (Step S34).

The local oscillator 31 generates a local oscillation signal with the local oscillating frequency set in Step S32 (Step S35) and outputs the local oscillation signal to the multiplier 32.

The multiplier 32 multiplies the quadrature modulation signal from the quadrature modulator 20 and the local oscillation signal from the local oscillator 31 to generate an RF signal in a predetermined frequency band (Step S36) and outputs the RF signal to the level regulator 40.

The bandwidth frequency characteristic table creating unit 53b measures the output level of the detector 42 at each frequency in a sweep bandwidth through the ADC 43 (Step S37).

The bandwidth frequency characteristic table creating unit 53b calculates the level difference between the ideal value and the measured value and creates the bandwidth frequency characteristic table 52 (Step S38). Data for the bandwidth frequency characteristic table 52 is stored in the frequency characteristic correction value determining unit 50.

The correction value determining unit 54 determines a frequency characteristic correction value with reference to the step ATT frequency characteristic table 51 and the bandwidth frequency characteristic table 52 (Step S39) and outputs the determined correction value to the filter coefficient setting unit 55.

The filter coefficient setting unit 55 sets a filter coefficient for flattening the frequency characteristics of the level of the RF signal to the DF 12 on the basis of the correction value determined by the correction value determining unit 54 (Step S40).

The test signal data is output from the waveform data storage unit 11 by the setting unit 17 (Step S41). The DF 12 corrects the frequency characteristics of the output test signal data (Step S42). As a result, the test signal data is output as an RF test signal of which the frequency characteristics of the output level is corrected to be flat from the signal generating device 10.

As described above, in the signal generating device 10 according to this embodiment, the DF 12 corrects the frequency characteristics of the level of the baseband signal on the basis of the bandwidth frequency characteristic table 52. Therefore, the signal generating device 10 can correct the frequency characteristics of the level of the broadband radio-frequency signal.

In addition, in the signal generating device 10 according to this embodiment, the DF 12 corrects the frequency characteristics of the level of the baseband signal on the basis of the step ATT frequency characteristic table 51. Therefore, the signal generating device 10 can perform correction considering the frequency characteristics of the step ATT and thus correct the frequency characteristics of the level of the broadband radio-frequency signal.

The signal generating device 10 according to this embodiment can perform correction, considering the frequency characteristics of the reference point of the level regulator 40, on the basis of the reference point frequency characteristic table 45. Therefore, the signal generating device 10 can correct the frequency characteristics of the level of the broadband radio-frequency signal.

Industrial Applicability

As described above, the signal generating device and the signal generating method according to the invention can correct the frequency characteristics of the level of the broadband radio-frequency signal. Therefore, the signal generating device and the signal generating method according to the invention are useful as a signal generating device and a signal generating method which correct the frequency characteristics of a radio-frequency signal supplied in a characteristic test for mobile communication terminals, such as mobile phones or mobile terminals.

Description of Reference Numerals and Signs

10: SIGNAL GENERATING DEVICE
11: WAVEFORM DATA STORAGE UNIT
12: DF (FREQUENCY CHARACTERISTIC CORRECTING MEANS)
14, 15: DAC
16: STEP ATT (SECOND OUTPUT LEVEL ADJUSTING MEANS)
17: SETTING UNIT
20: QUADRATURE MODULATOR (MODULATION SIGNAL GENERATING MEANS)
21, 22: MULTIPLIER
23: LOCAL OSCILLATOR
24: 90-DEGREE PHASE SHIFTER
25: ADDER
30: FREQUENCY CONVERSION UNIT
31: LOCAL OSCILLATOR (LOCAL OSCILLATION SIGNAL GENERATING MEANS)
32: MULTIPLIER (RADIO-FREQUENCY SIGNAL GENERATING MEANS)
40: LEVEL REGULATOR
41: ATT (OUTPUT LEVEL ADJUSTING MEANS, FIRST OUTPUT LEVEL ADJUSTING MEANS)
42: DETECTOR
43: ADC
44: ATT CONTROL UNIT
45: REFERENCE POINT FREQUENCY CHARACTERISTIC TABLE (SECOND FREQUENCY CHARACTERISTIC ACQUIRING MEANS)
46: TABLE CREATING UNIT (SECOND FREQUENCY CHARACTERISTIC ACQUIRING MEANS)
47: CONTROL VOLTAGE GENERATING UNIT (CONTROL VOLTAGE GENERATING MEANS)
50: FREQUENCY CHARACTERISTIC CORRECTION VALUE DETERMINING UNIT
51: STEP ATT FREQUENCY CHARACTERISTIC TABLE (THIRD FREQUENCY CHARACTERISTIC ACQUIRING MEANS)
52: BANDWIDTH FREQUENCY CHARACTERISTIC TABLE (FREQUENCY CHARACTERISTIC ACQUIRING MEANS, FIRST FREQUENCY CHARACTERISTIC ACQUIRING MEANS)
53: TABLE CREATING UNIT
53A: STEP ATT FREQUENCY CHARACTERISTIC TABLE CREATING UNIT (THIRD FREQUENCY CHARACTERISTIC ACQUIRING MEANS)
53B: BANDWIDTH FREQUENCY CHARACTERISTIC TABLE CREATING UNIT (FREQUENCY CHARACTERISTIC ACQUIRING MEANS, FIRST FREQUENCY CHARACTERISTIC ACQUIRING MEANS)
54: CORRECTION VALUE DETERMINING UNIT
55: FILTER COEFFICIENT SETTING UNIT (FREQUENCY CHARACTERISTIC CORRECTING MEANS)

The invention claimed is:

1. A signal generating device comprising:
modulation signal generating means for generating a modulation signal from a baseband signal;
local oscillation signal generating means for generating a local oscillation signal with a predetermined local oscillating frequency;
radio-frequency signal generating means for multiplying the modulation signal and the local oscillation signal to generate a radio-frequency signal in a predetermined frequency band;
output level adjusting means for adjusting the level of the radio-frequency signal;
frequency characteristic acquiring means for acquiring frequency characteristics of the level of the radio-frequency signal in the frequency band which is output from the output level adjusting means on the basis of a center frequency of the radio-frequency signal; and
frequency characteristic correcting means for correcting the frequency characteristics of the level of the baseband signal on the basis of the frequency characteristics acquired by the frequency characteristic acquiring means.

2. The signal generating device according to claim 1,
wherein the modulation signal generating means generates the modulation signal from a calibration signal, which is a baseband signal for generating a radio-frequency signal whose frequency is changed between an upper limit frequency and a lower limit frequency of the frequency band over time, and
the frequency characteristic acquiring means acquires the output level of the output level adjusting means in correspondence with the change in the frequency.

3. The signal generating device according to claim 2,
wherein the calibration signal is a baseband signal for generating a radio-frequency signal which sweeps the frequency from the upper limit frequency to the lower limit frequency of the frequency band, or from the lower limit frequency to the upper limit frequency of the frequency band.

4. The signal generating device according to claim 2,
wherein the output level adjusting means according to claim 1 is provided as first output level adjusting means,
the signal generating device further includes:
second output level adjusting means for adjusting the output level of an output signal from the first output level adjusting means; and
third frequency characteristic acquiring means for acquiring the frequency characteristics of the output level of the second output level adjusting means, and
the first frequency characteristic correcting means corrects the frequency characteristics of the level of the baseband signal considering the frequency characteristics acquired by the third frequency characteristic acquiring means.

5. The signal generating device according to claim 1,
wherein the frequency characteristic acquiring means according to claim 1 is provided as first frequency characteristic acquiring means, and
the signal generating device further includes:
second frequency characteristic acquiring means for acquiring the frequency characteristics of the output level of the output level adjusting means; and
control voltage generating means for generating a control voltage for controlling the amount of adjustment of the output level adjusting means on the basis of the frequency characteristics acquired by the second frequency characteristic acquiring means and correcting the frequency characteristics of the output level of the output level adjusting means.

6. A signal generating method comprising:
a modulation signal generating step of generating a modulation signal from a baseband signal;
a local oscillation signal generating step of generating a local oscillation signal with a predetermined local oscillating frequency;
a radio-frequency signal generating step of multiplying the modulation signal and the local oscillation signal to generate a radio-frequency signal in a predetermined frequency band;
a frequency characteristic acquiring step of acquiring frequency characteristics of the level of the radio-frequency signal in the frequency band generated in the radio-frequency signal generating step on the basis of a center frequency of the radio-frequency signal; and
a frequency characteristic correcting step of correcting the frequency characteristics of the level of the baseband signal on the basis of the frequency characteristics acquired in the frequency characteristic acquiring step.

7. The signal generating method according to claim 6,
wherein the modulation signal generating step generate the modulation signal from a calibration signal, which is a baseband signal for generating a radio-frequency signal whose frequency is changed between an upper limit frequency and a lower limit frequency of the frequency band over time, and
the frequency characteristic acquiring step acquires the output level of the radio-frequency signal in correspondence with the change in the frequency.

8. The signal generating method according to claim 7,
wherein the calibration signal is a baseband signal for generating a radio-frequency signal which sweeps the frequency from the upper limit frequency to the lower limit frequency of the frequency band, or from the lower limit frequency to the upper limit frequency of the frequency band.

9. The signal generating method according to claim 6,
wherein the frequency characteristic acquiring step according to claim 6 is provided as a first frequency characteristic acquiring step,
the frequency characteristic correcting step according to claim 6 is provided as a first frequency characteristic correcting step, and
the signal generating method further includes:
an output level adjusting step of adjusting the output level of the radio-frequency signal generated in the radio-frequency signal generating step;
a second frequency characteristic acquiring step of acquiring frequency characteristics of the output level; and
a second frequency characteristic correcting step of correcting the frequency characteristics of the output level on the basis of the frequency characteristics acquired in the second frequency characteristic acquiring step.

10. The signal generating method according to claim 9,
wherein the output level adjusting step according to claim 9 is provided as a first output level adjusting step,
the signal generating method further includes:
a second output level adjusting step of adjusting the output level of the output signal in the first output level adjusting step; and
a third frequency characteristic acquiring step of acquiring the frequency characteristics of the output level in the second output level adjusting step, and
the first frequency characteristic correcting step corrects the frequency characteristics of the level of the baseband signal considering the frequency characteristics acquired in the third frequency characteristic acquiring step.

* * * * *